United States Patent [19]

Uchikawa

[11] 4,388,377

[45] Jun. 14, 1983

[54] TAR INHIBITOR COATED LAYER

[75] Inventor: Fusaoki Uchikawa, Kamakura, Japan

[73] Assignee: Mitsubishi Denki Kabushiki Kaisha, Tokyo, Japan

[21] Appl. No.: 260,099

[22] Filed: May 4, 1981

[30] Foreign Application Priority Data

Jul. 11, 1980 [JP] Japan ................................. 55/94860

[51] Int. Cl.³ .......................... B32B 9/04; B32B 15/04
[52] U.S. Cl. .................................... 428/446; 252/383; 428/447; 428/450; 428/457; 428/469; 428/470; 428/489
[58] Field of Search ............... 428/457, 446, 447, 450, 428/469, 470, 489; 252/383

[56] References Cited

U.S. PATENT DOCUMENTS

| | | | |
|---|---|---|---|
| 4,152,472 | 5/1979 | Ohbu et al. | 428/457 X |
| 4,175,611 | 11/1979 | Fletcher | 428/457 X |
| 4,315,971 | 2/1982 | Taylor et al. | 428/457 X |

*Primary Examiner*—Thomas J. Herbert, Jr.
*Attorney, Agent, or Firm*—Oblon, Fisher, Spivak, McClelland & Maier

[57] ABSTRACT

A tar inhibitor coated layer formed on a wall of a combustion device inhibiting the formation of tar caused by combustion of oil, which coated layer comprises a porous binder, a reducing agent selected from the group consisting of a metal and a metallic salt, and optionally an alkaline metallic salt incorporated in said porous binder.

5 Claims, No Drawings

TAR INHIBITOR COATED LAYER

BACKGROUND OF THE INVENTION

1. Field of the Invention

The present invention relates to a tar inhibitor for preventing adhesion of tar on a part of combustion devices and apparatus or distillators.

2. Description of the Prior Arts

It has been found the following disadvantages of functional deterioration by adhesion of tar on an inner wall of a carburettor for a fuel and a nozzle for spraying a fuel with air in combustion devices and apparatuses such as kerosene heaters and gasoline engines.

(1) A temperature on an inner wall of a carburettor is decreased by adhesion of tar and a gasification of a fuel oil is deteriorated by clogging a nozzle.

(2) An incomplete combustion is caused.

(3) Bad smell and smoke are formed.

In a distillor or a dry distillor, a purity of each distilled fraction is disadvantageously decreased by adhesion of tar on the wall of distillation passage.

Various materials for inhibiting adhesions of tar have been studied to overcome these disadvantages and the effectiveness of solid oxidizing catalysts has been found and proposed.

However, it has not been satisfactorily inhibited adhesion of tar.

SUMMARY OF THE INVENTION

It is an object of the present invention to provide a tar inhibitor which inhibits adhesion of tar on a wall of a combustion device and apparatus or a distillator.

It is another object of the present invention to provide a tar inhibitor coated layer which is formed on an inner wall of a combustion device or apparatus or a distillator.

The foregoing and other objects of the present invention have been attained by providing a tar inhibitor composition which comprises a reducing agent and/or an alkaline agent which impart a function for inhibiting production of tar caused by a polymerization under oxidations in contact with a combustion gas which causes tar, and a tar inhibitor coated layer which is formed on a wall of a device or apparatus forming tar by a combustion of an oil which comprises a binder and a reducing agent and/or an alkaline agent which impart a function for inhibiting production of tar caused by a polymerization under oxidations in contact with a combustion gas which causes tar.

DETAILED DESCRIPTION OF THE PREFERRED EMBODIMENTS

In the present invention, the reducing agent inhibits polymerization of tar-forming materials under oxidation and the alkaline agent neutralizes and hydrolyzes the products formed by certain polymerization of the tar-forming materials whereby the formation and solidification of tar are prevented.

The reason of the effect of the tar inhibitors of the present invention will be illustrated.

In an initial step of a formation of tar by an oxidation of kerosene, the following reactions are repeated to gradually produce high boiling matters.

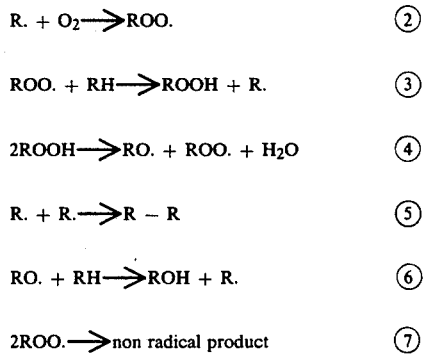

wherein RH represents hydrocarbon; R. represents hydrocarbon radical; H. represents hydrogen radical; RO. represents oxy radical; ROO. represents peroxy radical; ROH represents hydride; ROOH represents hydroperoxide; R—R represents polymer.

A part of hydrocarbons was activated by light and heat to start the reaction (1) whereby ROH, ROOH and R—R and formed. The non-radical materials formed by the reaction (7) are alcohols, aldehydes and ketones which are further oxidized to be converted into acids, oxyacids, acid anhydrides and esters and further polymerized under oxidation to be converted into high boiling matters.

The reducing agent used in the present invention is effective for inhibiting the sequential oxidations. The alkaline agent used in the present invention is effective for neutralizng acidic materials such as acids such as carboxylic acids and oxyacids to prevent the reactions and also effective for hydrolyzing the resulting esters into alcohols and acids to prevent the reactions.

Suitable reducing agents used in the present invention include Zn powder and Al powder used in Compositions Nos. 1 and 2 as well as the other metallic powder, carbon powder, sulfites, ferrous salts and stannous salts which are thermally stable.

Suitable alkaline agents used in the present invention include potassium silicate, sodium aluminate and sodium silicate used in Compositions Nos. 1 and 3 as well as the other alkaline materials such as sodium hydroxide, lithium silicate and sodium carbonate which are thermally stable.

When the oxidizing catalyst is used together with the tar inhibitor, the oxidizing catalysts can be Pt, Pd, other platinum group metals and metal oxides such as CuO, NiO, $MnO_2$, $Fe_2O_3$, CoO, $Co_3O_4$ and $Cr_2O_3$ and complexes thereof.

A porous coated layer is formed by baking the mixture of the reducing agent and/or the alkaline agent as the tar inhibitors with additives for firmly bonding the active ingredients.

Suitable additives include phosphates such as aluminum phosphate monobasic, alkali silicates; glass frit (enamel); silicon resin; coloidal silica; colloidal alumina, and colloidal iron hydroxide; calcium salts such as calcium aluminate; and cements such as alumina cement and Portland cement.

The reducing agents, the alkaline agents, the catalysts and the additives are not limited to the above-mentioned components and can be selected.

The tar inhibitor of the present invention can be applied for not only Clean Heater but also the other combustors, distillators and dry distillators of oil gasification type fan heaters, oil gasification type hot water suppliers, gasoline engines and Diesel engines.

In the following examples, the tar inhibitor is applied in a form of a porous coated layer. The tar inhibitor can be also applied in the other form such as a block form or a deposition on a porous ceramic.

In accordance with the present invention, the reducing agent and/or the alkaline agent is used as the tar inhibitor for oil combustion devices and apparatuses whereby the adhesion of tar can be remarkably reduced to prevent functional deterioration of various oil combustion devices and apparatuses.

The present invention will be further illustrated by certain examples and references which are provided for purposes of illustration only and are not intended to be limiting the present invention.

EXAMPLE 1

A forcible suction-exhaust type oil gasification hot air heater equipped with an inner oil tank (hereinafter referring to Clean Heater: Mitsubishi Electric Co.) was used for tests by coating an inner wall of an oil carburettor with the following compositions.

| Sample No. 1 (Composition No. 1): | | |
|---|---|---|
| Tar inhibitor: | Reducing agent (Zn powder): | 30 wt. parts |
| | Alkaline agent (potassium silicate): | 30 wt. parts |
| Oxidizing catalyst: Additive 1 | Nickel oxide: | 50 wt. parts |
| Binder: Additive 2 | Methyl phenyl silicone: | 30 wt. parts |
| Coated layer improver: | Alumina silica, thinner: | 50 wt. parts |

Additive 1 is a binder and Additive 2 is a coated layer improver for improving adhesiveness and characteristics of the coated layer. They have high heat resistance at a temperature of the inner wall of the oil carburettor (230°–280° C.) and impart high strength of the coated layer and high adhesiveness to the base (aluminum die casting) and form a porous coated layer.

The above-mentioned components were mixed in a ball mill for about 30 minutes and the mixture was uniformly coated on the inner wall of the oil carburettor by spraying it. This was dried at 80° C. for 30minutes and baked at 400° C. for 30 minutes to form a porous coated layer having high strength and a thickness of about 100 μm.

SAMPLE NO. 2

Sample No. 2 was prepared by mixing the components of Composition No. 1 except eliminating the oxidizing catalyst and coating the mixture to form a coated layer having a thickness of about 100 μm on the inner wall of the oil carburettor.

SAMPLE NO. 3

Sample No. 3 was prepared by mixing the components of Composition No. 1 except eliminating the tar inhibitors and coating the mixture to form a coated layer having a thickness of about 100 μm in the inner wall of the oil carburettor.

SAMPLE NO. 4

Sample No. 4 was prepared without forming any coated layer on the inner wall of the oil carburettor.

Continuous combustion tests were carried out for 100 hours by using each Clean Heater equipped with each oil carburettor of Samples Nos. 1 to 4.

In order to shorten the test time, kerosene in a white polyethylene tank was exposed outdoor for 1 year to deteriorate it into brown color. The deteriorated kerosene contained a large amount of high boiling matters which easily cause tar because of an oxidation by oxygen and sunlight.

The test results are shown in Table.

TABLE

| Sample | Combustion time | | |
|---|---|---|---|
| | 10 hr. | 50 hr. | 100 hr. |
| Sample No. 1 Tar inhibitors + Oxidizing catalyst | none | none | sub-none |
| Sample No. 2 Tar inhibitors | none | sub-none | slight tar |
| Sample No. 3 Oxidizing catalyst | none | slight tar | tar adhesion |
| Sample No. 4 No coated layer | slight tar | tar adhesion | combustion trouble |

Note:
none: No tar was found.
sub-none: Tar was not substantially found.
slight tar: Tar was slightly adhered on the inner wall of the carburettor.
tar adhesion: Tar was adhered on the inner wall of the carburettor.

In accordance with the preparation of Sample No. 1 (Composition No. 1) except using the following Composition No. 2 or No. 3 each coated layer was formed on the inner wall of the oil carburettor and each continuous combustion test was carried out. As a result, the similar results to Sample No. 1 were found.

| Composition No. 2: | | |
|---|---|---|
| Tar inhibitor: | Reducing agent (Al powder): | 50 wt. parts |
| Oxidizing catalyst: | (MnO₂): | 50 wt. parts |
| Additive 1: | Aluminum phosphate: | 50 wt. parts |
| Additive 2: | Alumina, magnesium oxide, water: | 60 wt. parts |
| Composition No. 3: | | |
| Tar inhibitor: | Alkaline agent (sodium aluminate): | 30 wt. parts |
| Oxidizing agent: | (copper oxide): | 50 wt. parts |
| Additive 1: | Sodium silicate | 50 wt. parts |
| Additive 2: | Alumina, silica water: | 60 wt. parts |

As it is clearly understood from the results, the oil carburettors having a coated layer containing the tar inhibitor and/or the oxidizing catalyst on the inner wall impart excellent effect for inhibiting adhesion of tar in comparison with the conventional oil carburettor. Thus, Sample No. 3 of Example using the oxidizing catalyst without the tar inhibitor imparts inferior effect to those of Samples using the tar inhibitor.

Additive 1 of Composition No. 3 is an alkaline binder. A desired effect is imparted by using the alkaline agent as the binder for the coated layer.

I claim:

1. A tar inhibitor coated layer formed on a wall of a combustion device inhibiting the formation of tar caused by combustion of oil, which coated layer comprises a porous binder, a reducing agent selected from the group consisting of a metal and a metallic salt, and optionally an alkaline metallic salt incorporated in said porous binder.

2. The tar inhibitor coated layer according to claim 1 which further comprises an oxidizing catalyst.

3. The tar inhibitor coated layer according to claim 1 wherein said reducing agent is selected from the group consisting of metallic powders, carbon powder, sulfites, ferrous salts and stannous salts which are thermally stable.

4. The tar inhibitor coated layer according to claim 1 wherein said alkaline agent is selected from the group consisting of alkali silicates, alkali aluminates, alkali carbonates and alkali hydroxides which are thermally stable.

5. The tar inhibitor coated layer according to claim 1 wherein said binder is a silicate or silicone.

* * * * *